(12) United States Patent
Czelhan et al.

(10) Patent No.: US 12,149,762 B2
(45) Date of Patent: *Nov. 19, 2024

(54) FRAGMENT-ALIGNED AUDIO CODING (71) Applicant: Fraunhofer-Gesellschaft zur Foerderung der angewandten Forschung e.V., Munich (DE)

(72) Inventors: Bernd Czelhan, Happurg (DE); Harald Fuchs, Roettenbach (DE); Ingo Hofmann, Nuremberg (DE); Herbert Thoma, Erlangen (DE); Stephan Schreiner, Birgland (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/447,279

(22) Filed: Aug. 9, 2023

(65) Prior Publication Data
US 2023/0388565 A1    Nov. 30, 2023

Related U.S. Application Data (60) Division of application No. 17/541,188, filed on Dec. 2, 2021, now Pat. No. 11,765,415, which is a
(Continued)

(30) Foreign Application Priority Data

Mar. 9, 2015  (EP) .................................. 15158317

(51) Int. Cl.
H04N 21/242    (2011.01)
G10L 19/16     (2013.01)
(Continued)

(52) U.S. Cl.
CPC ......... *H04N 21/242* (2013.01); *G10L 19/167* (2013.01); *G10L 25/57* (2013.01);
(Continued)

(58) Field of Classification Search
CPC .. H04N 21/242; H04N 19/40; H04N 21/2335; H04N 21/23424;
(Continued)

(56) References Cited

U.S. PATENT DOCUMENTS 6,124,895 A     9/2000 Fielder
2010/0217607 A1  8/2010 Neuendorf et al.
(Continued)

FOREIGN PATENT DOCUMENTS

CN    102089811 A    6/2011
CN    103177725 A    6/2013
(Continued)

OTHER PUBLICATIONS

Information Technology—Dynamic Adaptive Streaming over HTTP (DASH)—Part 1: Media presentation description and segment formats, Final Draft, ISO/IEC FDIS 23009-1:2013(E), 2013.
(Continued)

*Primary Examiner* — Vineeta S Panwalkar
(74) *Attorney, Agent, or Firm* — PERKINS COIE LLP; Michael A. Glenn (57) ABSTRACT

Audio video synchronization and alignment or alignment of audio to some other external clock are rendered more effective or easier by treating fragment grid and frame grid as independent values, but, nevertheless, for each fragment the frame grid is aligned to the respective fragment's beginning. A compression effectiveness lost may be kept low when appropriately selecting the fragment size. On the other hand, the alignment of the frame grid with respect to the fragments' beginnings allows for an easy and fragment-
(Continued)

synchronized way of handling the fragments in connection with, for example, parallel audio video streaming, bitrate adaptive streaming or the like.

7 Claims, 8 Drawing Sheets

Related U.S. Application Data continuation of application No. 16/784,763, filed on Feb. 7, 2020, now Pat. No. 11,218,754, which is a division of application No. 15/697,215, filed on Sep. 6, 2017, now Pat. No. 10,595,066, which is a continuation of application No. PCT/EP2016/054916, filed on Mar. 8, 2016.

(51) Int. Cl.

| | | |
|---|---|---|
| *G10L 25/57* | (2013.01) | |
| *H04N 19/40* | (2014.01) | |
| *H04N 21/233* | (2011.01) | |
| *H04N 21/234* | (2011.01) | |
| *H04N 21/2343* | (2011.01) | |
| *H04N 21/845* | (2011.01) | |
| *G10L 21/055* | (2013.01) | |

(52) U.S. Cl.
CPC ......... *H04N 19/40* (2014.11); *H04N 21/2335* (2013.01); *H04N 21/23424* (2013.01); *H04N 21/23439* (2013.01); *H04N 21/8456* (2013.01); *G10L 21/055* (2013.01)

(58) Field of Classification Search
CPC .......... H04N 21/23439; H04N 21/8456; G10L 19/167; G10L 25/57; G10L 21/055
See application file for complete search history.

(56) References Cited

U.S. PATENT DOCUMENTS

| | | |
|---|---|---|
| 2011/0150099 A1 | 6/2011 | Owen |
| 2011/0173010 A1 | 7/2011 | Lecomte et al. |
| 2013/0041672 A1 | 2/2013 | Doehla et al. |
| 2013/0297296 A1 | 11/2013 | Yoo et al. |
| 2015/0237091 A1 | 8/2015 | Liang et al. |
| 2016/0337672 A1 | 11/2016 | Lee et al. |

FOREIGN PATENT DOCUMENTS

| | | |
|---|---|---|
| CN | 103426434 A | 12/2013 |
| JP | 2013515401 A | 5/2013 |
| JP | 2013528825 A | 7/2013 |
| RU | 2012148132 A | 5/2014 |
| WO | 2012126893 A1 | 9/2012 |

OTHER PUBLICATIONS

Information Technology—High Efficiency Coding and Media Delivery in Heterogeneous Environments—Part 1: MPEG media transport (MMT), ISO/IEC DIS 23008-1 2nd Edition, 2015.
"Information Technology—High Efficiency Coding and Media Delivery in Heterogeneous Environments—Part 3: 3D audio", ISO/IEC DIS 23008-3, Jul. 25, 2014.
"Information Technology—Dynamic Adaptive Streaming over HTTP (DASH)—Part 1: Media presentation description and segment formats", ISO/IEC DIS 23009-1, Aug. 30, 2011.
"OpenCable(TM) Specifications Adaptive Transport Stream Specification", OC-SP-ATS-I01-140214; Cable Television Laboratories, Inc., Feb. 14, 2014, 48 pages.
"Technical Note: AAC Implementation Guideline for DASH", 111. MPEG Meeting; Geneva; Motion Picture Expert Group or ISO/IEC JTC1/SC29/WG11 N15072, Feb. 2015, 24 pages.
ISO/IEC 23008-3:2015(E) , "Information Technology—High Efficiency Coding and Media Delivery in Heterogeneous Environments—Part 3: 3D audio", , 438 pp.
Schreiner, Stephan, et al., "Proposed update to ISO/IEC 13818-1:201x/PDAM6", 111. MPEG Meeting; Geneva; Motion Picture Expert Group or ISO/IEC JTC1/SC29/WG11 MPEG2015/m35872, 20 pages.

FRAGMENT-ALIGNED AUDIO CODING

CROSS-REFERENCE TO RELATED APPLICATIONS

This application is a divisional of U.S. patent application Ser. No. 17/541,188, filed Dec. 2, 2021, which is a continuation of U.S. patent application Ser. No. 16/784,763, filed Feb. 7, 2020, now U.S. Pat. No. 11,218,754, issued Jan. 4, 2022, which is a divisional of U.S. patent application Ser. No. 15/697,215, filed Sep. 6, 2017, now U.S. Pat. No. 10,595,066, issued Mar. 17, 2020, which is a continuation of copending International Application No. PCT/EP2016/054916, filed Mar. 8, 2016, which claims priority from European Application No. EP 15158317.6, filed Mar. 9, 2015, which are each incorporated herein in its entirety by this reference thereto.

The present application is concerned with an audio codec suitable, for example, for usage in parallel to coded video.

BACKGROUND OF THE INVENTION

When delivering audio and video content over a transmission channel with either fixed or variable bit rate, one goal is to ensure audio video synchronization and the enablement of advanced use-cases such as splicing.

Audio and video synchronization and alignment has been a crucial part when building audio video systems. Normally, audio and video codecs are not using the same frame duration. Due to this reason, today's audio codecs are not frame aligned. As an example, this is also true for the widely used AAC-family. The example is based on the DVB standard, where a 1024 frame size and a sampling frequency of 48 kHz are used. This leads to audio frames with a duration of $$\frac{1024 \text{ samples}}{48000 \text{ Hz}} \approx 0.0213 \text{ sec.}$$

In contrast the common DVB refresh rate for video is either 25 Hz or 50 Hz, which leads to video frame durations of 0.02 sec or 0.04 sec respectively.

Especially when changing the configuration of the audio stream or changing the program, the video and audio need to be aligned again. Today's systems will change the audio configuration slightly before or after the corresponding video because human beings are not able to recognize small differences in audio and video synchronization.

Unfortunately this increases the complexity of splicing where a national advertisement gets replaced by a local one, since the replaced video stream has to begin also with this small offset. In addition new standards are asking for a more accurate video and audio synchronization to improve the overall user experience.

Therefore recent audio codecs can deal with a wide range of possible frame sizes to match the video frame size. The problem here is that this—besides solving the alignment problem—has a big impact of coding efficiency and performance.

Streaming in broadcast environments imposes special problems.

Recent developments have shown that "adaptive" streaming is considered as a transport layer even for linear broadcast. To match all requirements which are slightly different for over the top application and over the air application adaptive streaming has been optimized. Here we will focus on one concrete adaptive streaming technology but all given examples will also work for other file-based technologies like MMT.

Figure 7:
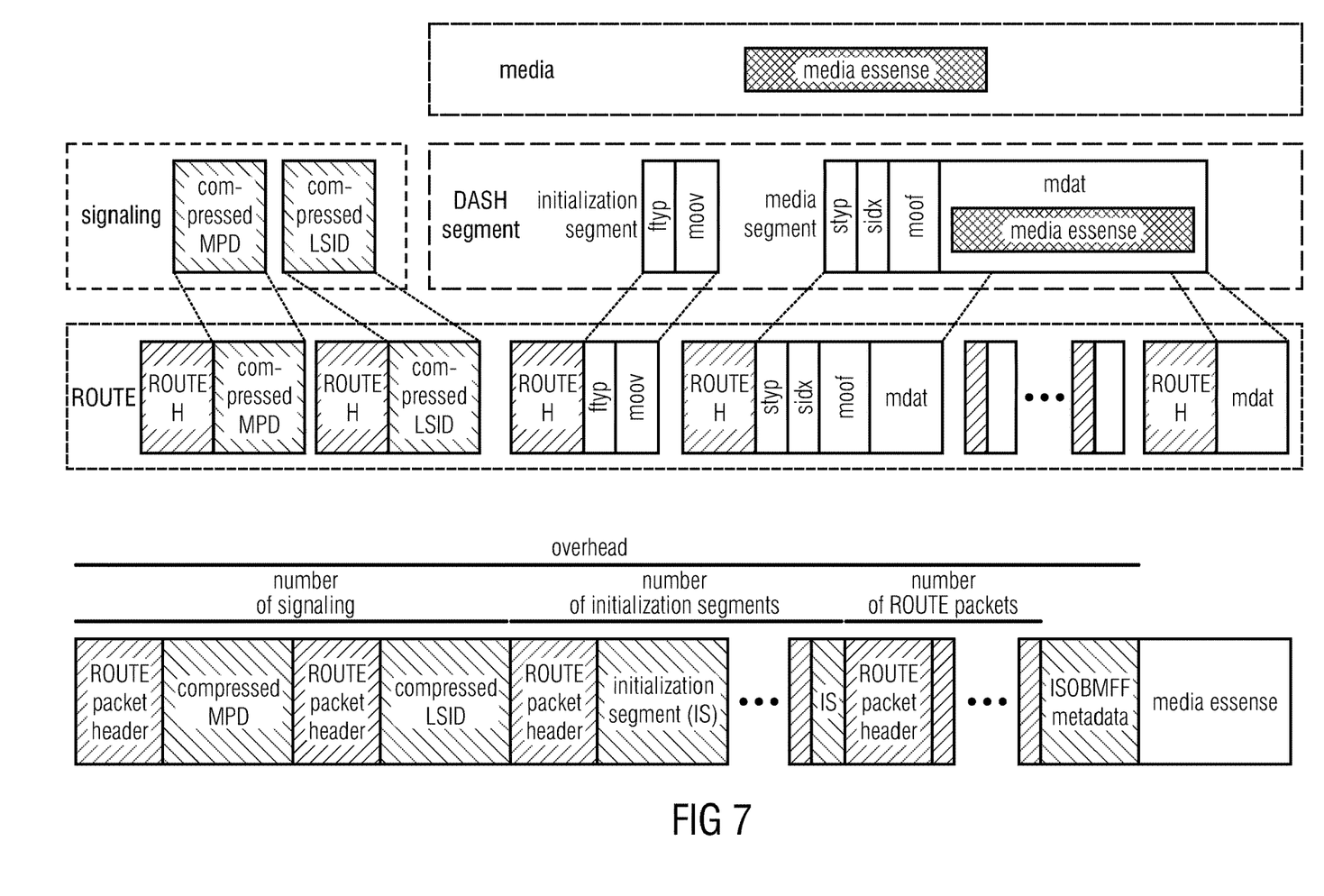
FIG. 7 shows a packetized DASH segment delivered over ROUTE in accordance with [1] for comparison purposes.

FIG. 7 shows a proposal for the ATSC 3.0 standard which is currently under development. In this proposal, an optimized version of MPEG-DASH is considered to be used over a fixed rate broadcast channel. Since DASH was designed for a variable rate, unicast channel, like LTE, 3G or broadband Internet, some adjustments were needed which are covered by the proposal. The main difference to the regular DASH use-case is that the receiver of a broadcast channel has no backchannel and receives a unicast. Normally the client can extract the location of the initialization segment after receiving and parsing of the MPD. After that the client is able to decode one segment after the other or can seek to a given timestamp. As shown in the above figure, in a broadcast environment this approach is not possible at all. Instead the MPD and the initialization segment(s) is/are repeated on a regular basis. The receiver is then able to tune-in as soon as it receives the MPD and all needed initialization segments.

This involves a tradeoff between short tune-in time and small overhead. For a regular broadcaster a segment length of approx. 1 second seems to be feasible. This means that between two MPDs there is one audio and one video segment (if the program contains only audio and video) both with a length of approx. one second.

Figure 8:
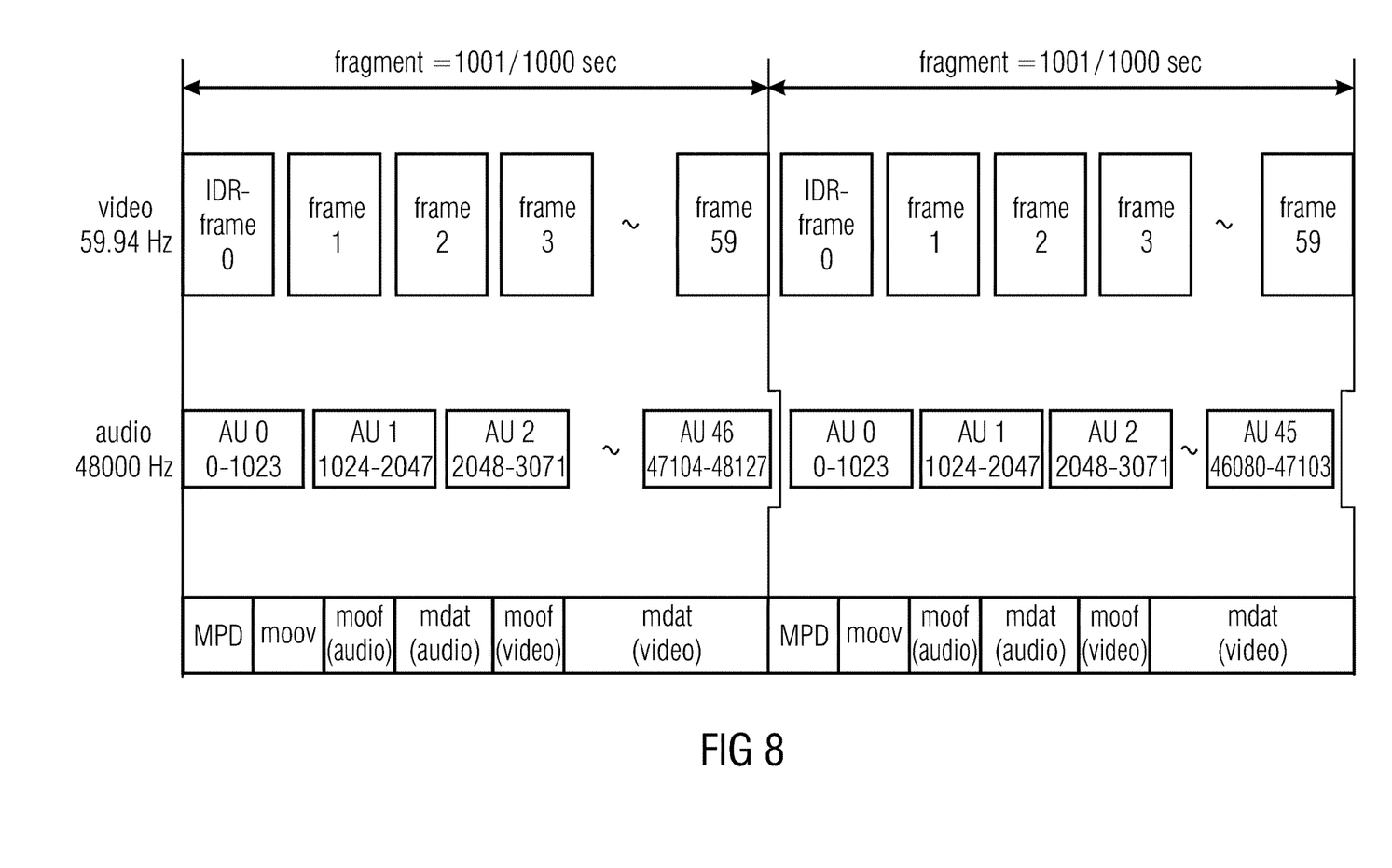
FIG. 8 shows two consecutive fragments carrying audio and video in accordance with current fragmentation concept according to which the audio fragmentation involves different fragmented durations.

For audio and video alignment the former mentioned aspect is also true when using DASH. In addition audio segments have to be slightly longer or shorter to keep audio and video alignment. This is shown in FIG. 8.

If an audio or video configuration change is triggered. This change has to happen at a segment boundary, since there is no other way to transmit an updated initialization segment. For that, video and audio are padded (with either black frames or silence) to fill a full segment. But this doesn't solve the issue of misalignment of video and audio. For splicing and program changes, there can be a small audio and video mismatch depending on the current segment duration drift.

SUMMARY

According to an embodiment, an encoder for encoding audio content into an encoded data stream may have: an encoding stage configured to encode the audio content in units of audio frames; and a fragment provider configured to provide the audio content to the encoding stage in units of temporal fragments by providing, for a currently provided temporal fragment, a portion of the audio content to the encoding stage which includes the currently provided temporal fragment, wherein the encoder is configured to encode each temporal fragment into an encoded representation of the respective temporal fragment in units of audio frames, and the fragment provider is configured to provide the audio content to the encoding stage such that the audio frames are aligned to the respective temporal fragment such that for each temporal fragment a beginning of a first audio frame and a beginning of the respective temporal fragment coincide, and wherein the encoded representations of the temporal fragments are included in the encoded data stream, and a temporal length of the temporal fragments is a non-integer multiple of a temporal length of the audio frames, wherein the encoder is configured to signal within the encoded data stream a truncation information for identifying a portion of a trailing audio frame of the audio frames in units of which the temporal fragments are encoded, which exceeds a trailing end of the temporal fragments and temporally overlaps with a immediately succeeding temporal fragment of the fragment grid, wherein the truncation information includes a frame length value indicating the temporal length of the audio frames and a fragment length value indicating the temporal length of the temporal fragments and/or a truncation length value indicating a temporal length of a portion of a trailing audio frame of the audio frames in units of which the temporal fragments are encoded, which exceeds a trailing end of the temporal fragments and temporally overlaps with a immediately succeeding temporal fragment, or the difference between the temporal length of the portion of the trailing audio frame and the temporal length of the trailing audio frame.

According to another embodiment, a decoder for decoding audio content from an encoded data stream may have: an input interface configured to receive encoded representations of temporal fragments of the audio content, each of which has encoded thereinto a respective temporal fragment in units of audio frames temporally aligned to a beginning of the respective temporal fragment so that the beginning of the respective temporal fragment coincides with a beginning of a first audio frame of the audio frames; a decoding stage configured to decode reconstructed versions of the temporal fragments of the audio content from the encoded representations of the temporal fragments; and a joiner configured to join, for playout, the reconstructed versions of the temporal fragments of the audio content together, wherein a temporal length between fragment boundaries of the fragment grid is a non-integer multiple of a temporal length of the audio frames, wherein the joiner is configured to truncate the reconstructed version of a predetermined temporal fragment at a portion of a trailing audio frame of the audio frames in units of which the predetermined temporal fragment is coded into the encoded representation of the predetermined temporal fragment, which temporally exceeds a trailing end of the predetermined temporal fragment and temporally overlaps with a reconstructed version of an immediately succeeding temporal fragment, wherein the decoder is configured to determine the portion of the trailing audio frame on the basis of truncation information in the encoded data stream, wherein the truncation information includes a frame length value indicating a temporal length of the audio frames in units of which the predetermined temporal fragment is coded into the encoded representation of the predetermined temporal fragment, and a fragment length value indicating a temporal length of the predetermined temporal fragment from the beginning of the reconstructed version of the predetermined fragment to the fragment boundary with which the beginning of the reconstructed version of the succeeding temporal fragment coincides, and/or a truncation length value indicating a temporal length of the portion of the trailing audio frame or the difference between the temporal length of the portion of the trailing audio frame and the temporal length of the trailing audio frame.

According to another embodiment, a method for encoding audio content into an encoded data stream, using an encoding stage configured to encode the audio content in units of frames, may have the steps of: providing the audio content to the encoding stage in units of temporal fragments by providing, for a currently provided temporal fragment, a portion of the audio content to the encoding stage which includes the currently provided temporal fragment, encoding, performed by the encoding stage, each temporal fragment into an encoded representation of the respective temporal fragment in units of audio frames, wherein the audio content is provided to the encoding stage such that the audio frames are aligned to the respective temporal fragment such that for each temporal fragment a beginning of first audio frame of the audio frames in units of which the respective temporal fragment is encoded into the encoded representation of the respective temporal fragment and a beginning of the respective temporal fragment coincide, wherein the encoded representations of the temporal fragments are included in the encoded data stream, and a temporal length of the temporal fragments is a non-integer multiple of a temporal length of the frames, wherein the method includes signaling within the encoded data stream a truncation information for identifying a portion of a trailing audio frame of the audio frames in units of which the temporal fragments are encoded, which exceeds a trailing end of the temporal fragments and temporally overlaps with a immediately succeeding temporal fragment of the fragment grid, wherein the truncation information includes a frame length value indicating the temporal length of the audio frames and a fragment length value indicating the temporal length of the temporal fragments and/or a truncation length value indicating a temporal length of a portion of a trailing audio frame of the audio frames in units of which the temporal fragments are encoded, which exceeds a trailing end of the temporal fragments and temporally overlaps with a immediately succeeding temporal fragment of the fragment grid, or the difference between the temporal length of the portion of the trailing audio frame and the temporal length of the trailing audio frame.

According to another embodiment, a method for decoding audio content in units of temporal fragments of a fragment grid from an encoded data stream may have the steps of: receiving encoded representations of temporal fragments of the audio content, each of which has encoded thereinto a respective temporal fragment in units of audio frames temporally aligned to a beginning of the respective temporal fragment so that the beginning of the respective temporal fragment coincides with a beginning of a first audio frame of the audio frames; decode reconstructed versions of the temporal fragments of the audio content from the encoded representations of the temporal fragments; and joining, for playout, the reconstructed versions of the temporal fragments of the audio content together, wherein a temporal length between fragment boundaries of the fragment grid is a non-integer multiple of a temporal length of the audio frames, wherein the joining includes truncating the reconstructed version of a predetermined temporal fragment at a portion of a trailing audio frame of the audio frames in units of which the predetermined temporal fragment is coded into the encoded representation of the predetermined temporal fragment, which temporally exceeds a trailing end of the predetermined temporal fragment and temporally overlaps with a reconstructed version of an immediately succeeding temporal fragment, wherein the method further includes determining the portion of the trailing audio frame on the basis of truncation information in the encoded data stream, wherein the truncation information includes a frame length value indicating a temporal length of the audio frames in units of which the predetermined temporal fragment is coded into the encoded representation of the predetermined temporal fragment, and a fragment length value indicating a temporal length of the predetermined temporal fragment from the beginning of the reconstructed version of the predetermined fragment to the fragment boundary with which the beginning of the reconstructed version of the succeeding temporal fragment coincides, and/or a truncation length value indicating a temporal length of the portion of the trailing audio frame or the difference between the temporal length of the portion of the trailing audio frame and the temporal length of the trailing audio frame.

Another embodiment may have a non-transitory digital storage medium having a computer program stored thereon to perform the method for encoding audio content into an encoded data stream, using an encoding stage configured to encode the audio content in units of frames, the method having the steps of: providing the audio content to the encoding stage in units of temporal fragments by providing, for a currently provided temporal fragment, a portion of the audio content to the encoding stage which includes the currently provided temporal fragment, encoding, performed by the encoding stage, each temporal fragment into an encoded representation of the respective temporal fragment in units of audio frames, wherein the audio content is provided to the encoding stage such that the audio frames are aligned to the respective temporal fragment such that for each temporal fragment a beginning of first audio frame of the audio frames in units of which the respective temporal fragment is encoded into the encoded representation of the respective temporal fragment and a beginning of the respective temporal fragment coincide, wherein the encoded representations of the temporal fragments are included in the encoded data stream, and a temporal length of the temporal fragments is a non-integer multiple of a temporal length of the frames, wherein the method includes signaling within the encoded data stream a truncation information for identifying a portion of a trailing audio frame of the audio frames in units of which the temporal fragments are encoded, which exceeds a trailing end of the temporal fragments and temporally overlaps with a immediately succeeding temporal fragment of the fragment grid, wherein the truncation information includes a frame length value indicating the temporal length of the audio frames and a fragment length value indicating the temporal length of the temporal fragments and/or a truncation length value indicating a temporal length of a portion of a trailing audio frame of the audio frames in units of which the temporal fragments are encoded, which exceeds a trailing end of the temporal fragments and temporally overlaps with a immediately succeeding temporal fragment of the fragment grid, or the difference between the temporal length of the portion of the trailing audio frame and the temporal length of the trailing audio frame, when said computer program is run by a computer.

Another embodiment may have a non-transitory digital storage medium having a computer program stored thereon to perform the method for decoding audio content in units of temporal fragments of a fragment grid from an encoded data stream, the method having the steps of: receiving encoded representations of temporal fragments of the audio content, each of which has encoded thereinto a respective temporal fragment in units of audio frames temporally aligned to a beginning of the respective temporal fragment so that the beginning of the respective temporal fragment coincides with a beginning of a first audio frame of the audio frames; decode reconstructed versions of the temporal fragments of the audio content from the encoded representations of the temporal fragments; and joining, for playout, the reconstructed versions of the temporal fragments of the audio content together, wherein a temporal length between fragment boundaries of the fragment grid is a non-integer multiple of a temporal length of the audio frames, wherein the joining includes truncating the reconstructed version of a predetermined temporal fragment at a portion of a trailing audio frame of the audio frames in units of which the predetermined temporal fragment is coded into the encoded representation of the predetermined temporal fragment, which temporally exceeds a trailing end of the predetermined temporal fragment and temporally overlaps with a reconstructed version of an immediately succeeding temporal fragment, wherein the method further includes determining the portion of the trailing audio frame on the basis of truncation information in the encoded data stream, wherein the truncation information includes a frame length value indicating a temporal length of the audio frames in units of which the predetermined temporal fragment is coded into the encoded representation of the predetermined temporal fragment, and a fragment length value indicating a temporal length of the predetermined temporal fragment from the beginning of the reconstructed version of the predetermined fragment to the fragment boundary with which the beginning of the reconstructed version of the succeeding temporal fragment coincides, and/or a truncation length value indicating a temporal length of the portion of the trailing audio frame or the difference between the temporal length of the portion of the trailing audio frame and the temporal length of the trailing audio frame, when said computer program is run by a computer.

A basic idea underlying the present application is that audio video synchronization and alignment or alignment of audio to some other external clock may be rendered more effective or easier when fragment grid and frame grid are treated as independent values, but when, nevertheless, for each fragment the frame grid is aligned to the respective fragment's beginning. A compression effectiveness lost may be kept low when appropriately selecting the fragment size. On the other hand, the alignment of the frame grid with respect to the fragments' beginnings allows for an easy and fragment-synchronized way of handling the fragments in connection with, for example, parallel audio video streaming, bitrate adaptive streaming or the like.

BRIEF DESCRIPTION OF THE DRAWINGS

Embodiments of the present invention will be detailed subsequently referring to the appended drawings, in which.

DETAILED DESCRIPTION OF THE INVENTION

Before describing various embodiments of the present application, the advantages provided by, and the thoughts underlying, these embodiments are described first. In particular, imagine that an audio content is to be coded so as to accompany a video frame composed of a sequence of video frames. The problem is as outlined above in the introductory portion of the present application: nowadays audio codecs operate on a sample and frame basis which is no integer fraction or integer multiple of the video framerate. Accordingly, the embodiments described hereinafter use encoding/decoding stages operating in units of "usual" frames for which they are optimized. On the other hand, the audio content is subject to the audio codec underlying these encoding/decoding stages in units of temporal fragments which may be one or more, advantageously one to five, or even more advantageously one or two video frames long. For each such temporal fragment, the frame grid is chosen to be aligned to the beginning of the respective temporal fragment. In other words, the idea underlying the subsequently described embodiments is to produce audio fragments which are exactly as long as the corresponding video frame, with this approach having two benefits:
1) The audio encoder may still work on an optimized/native frame duration and does not have to leave its frame grid on fragment boundaries.
2) Any audio delay may be compensated by the usage of immediate playout information for the encoded representations of the temporal fragments. Splicing can happen at each fragment boundary. This reduces the overall complexity of the broadcast equipment significantly.

Figure 1:
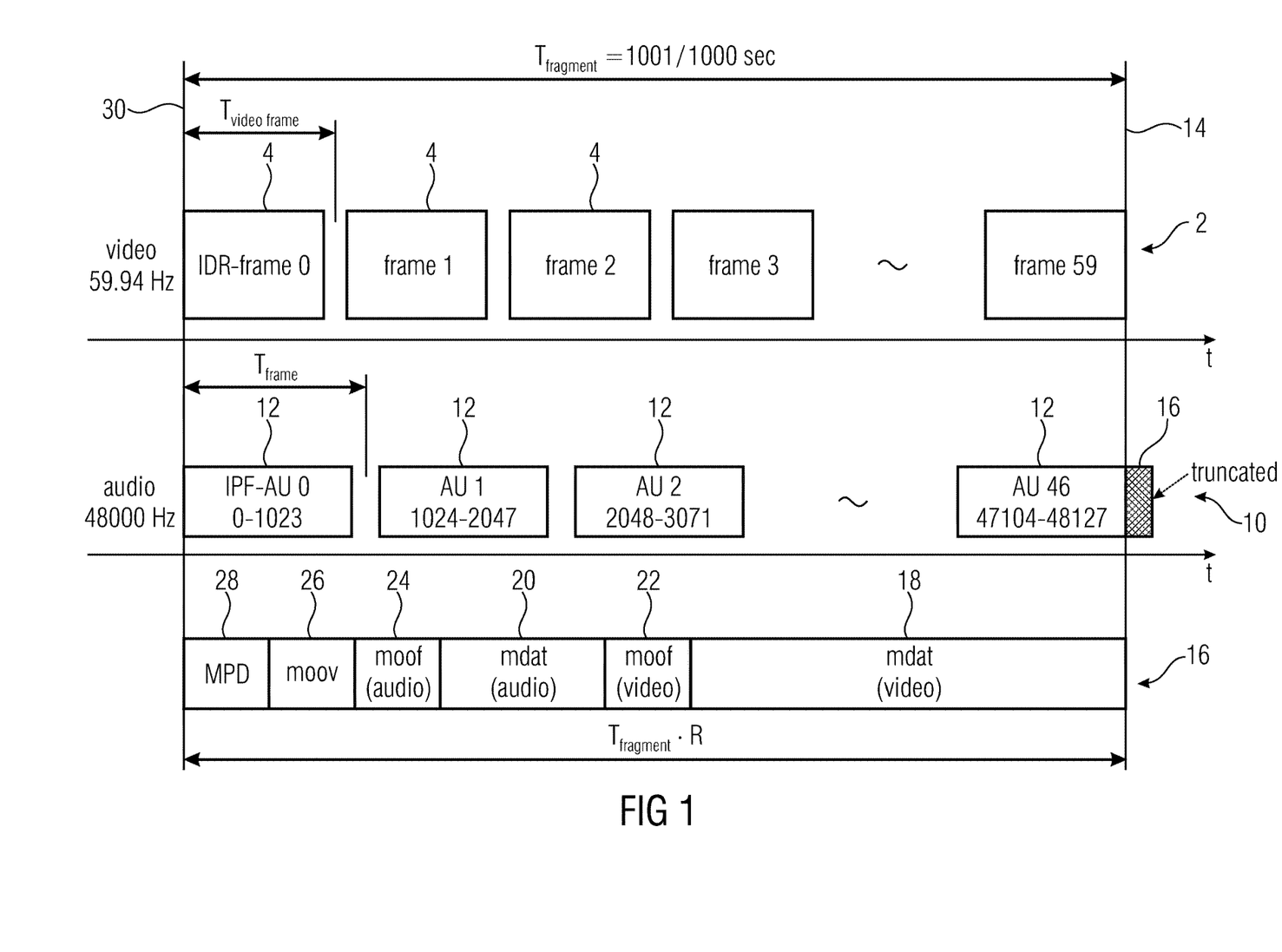
FIG. 1 shows a schematic diagram of a temporal fragment containing video and audio where the video and audio fragments are time-aligned in accordance with an embodiment of the present application.
Figure 2:
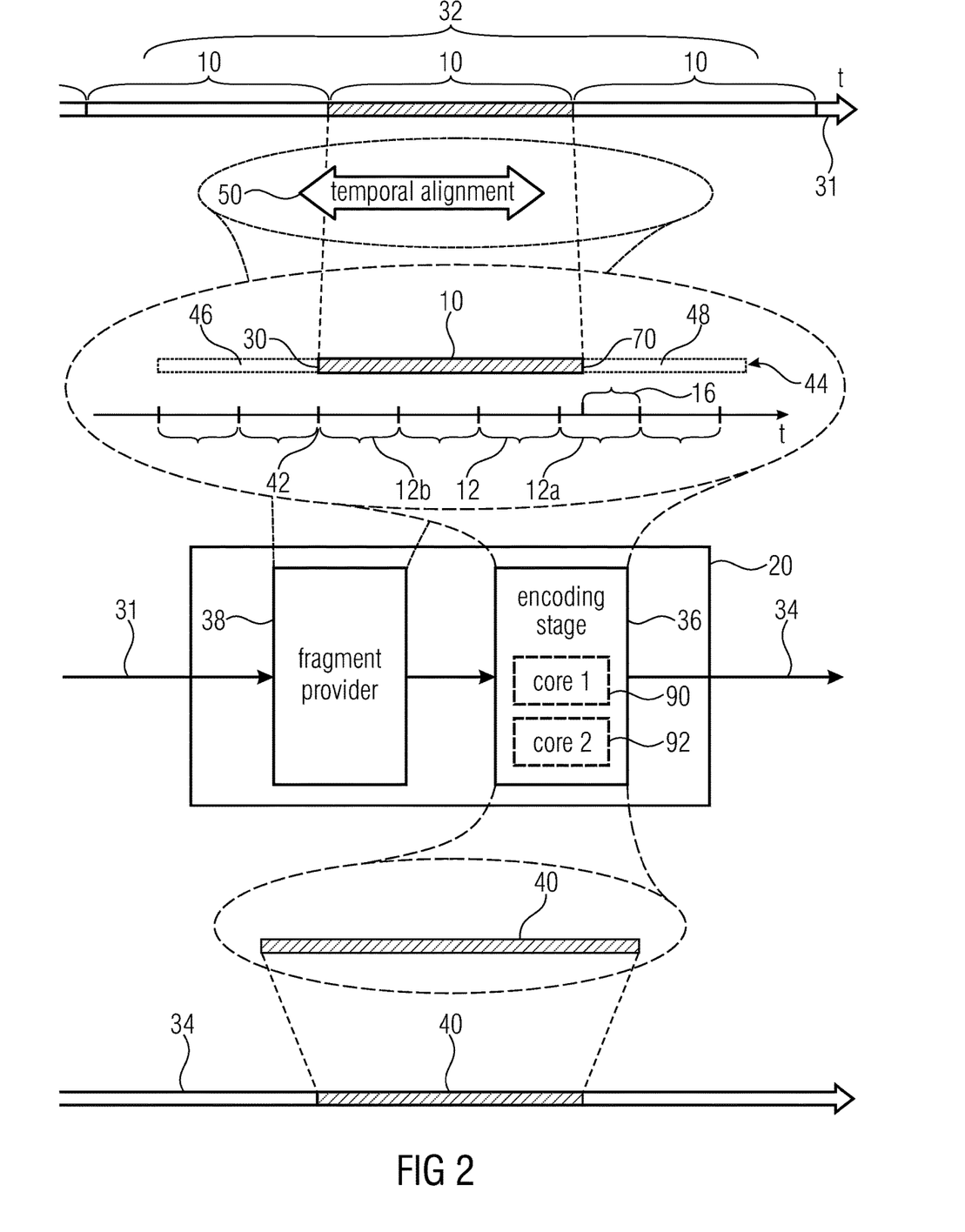
FIG. 2 shows a semi-schematic and block diagram of an encoder, the audio content encoded thereby and the encoded data stream generated thereby in accordance with an embodiment.

FIG. 1 shows an example for an audio fragment generated in a manner in accordance with an example set out below, which audio fragment accompanies a corresponding video fragment. Both audio fragment and video fragment are illustrated in a manner corresponding to FIG. B. That is, at 2, i.e. the top row of FIG. 1, FIG. 1 illustrates the video fragment as being composed of a number N of frames 4, i.e. video frames, wherein the frames are shown as squares sequentially arranged row-wise from left to right along their temporal playout order as illustrated by temporal axis t. The left hand edge of frame 0 and the right hand edge of frame 59 are shown as being registered to the beginning and end of the fragment, meaning the temporal length $T_{fragment}$ of the fragment is an integer multiple of the video frame length, the integer multiple N here being exemplarily 60. Temporally aligned to the video fragment 2, FIG. 2 illustrates there below an audio fragment 10 having encoded thereinto the audio content accompanying the video fragment 2 in units of frames or access units 12, here illustrated as rectangles extending horizontally, i.e. temporally, at a temporal pitch which shall illustrate their temporal frame length and this audio frame length is, unfortunately, such that the temporal length $T_{fragment}$ of the audio fragment 10 is no integer multiple of this frame length $T_{frame}$. For example, the relationship between the frame length $T_{frame}$ and the corresponding frame length of the video frames $T_{videoframe}$ may be such that the ratio therebetween is either irrational or the ratio therebetween may be represented by a proper fraction, completely reduced, where the numerator times the denominator is higher than, for example, 1000, so that a fragment length which would be a multiple of both the video frame length $T_{video\ frame}$ and the audio frame length $T_{frame}$ would be disadvantageously high.

FIG. 1 illustrates that, accordingly, a last or trailing frame, namely access unit 46, temporally covers a temporal portion of the audio content which exceeds the trailing end 14 of the audio fragment 10. Later on, it will be shown that the portion 16 exceeding or succeeding the trailing end 14 may be truncated or disregarded at the decoder side in playout, or that the whole trailing frame is actually not encoded with the decoder merely flushing its internal states so as to fill the "temporal hole" of the portion of the trailing frame as far as overlapping with the temporal fragment 10.

For illustration purposes, FIG. 1 illustrates at the lower half thereof, namely at 16, that the bit budget available for the temporal fragment composed of video and audio, namely $T_{fragment} \cdot R$ with R being a bitrate, could be used for carrying the video data 18 into which the video frames 4 of fragment 2 are coded, the audio data 20 into which the audio content of audio fragment 10 are coded, header data 22 and 24 of both, respectively, configuration data 26 indicating, for example, the spatial resolution, temporal resolution and so forth at which the video frames 4 are coded into data 18 and the configuration such as the number of channels at which the audio frames 12 of fragment 2 are coded into data 20 as well as a manifest or media presentation description here illustratively included into the data for the co-aligned fragments 2 and 10 so as to indicate, for example, the versions at which video and audio are available, the versions differing in bitrate. It should be understood that the example of FIG. 1 is merely illustrative and that the embodiments described hereinafter are not restricted to being used in connection with bitrate adaptive streaming and sending a manifest to the client and so forth. FIG. 1 shall merely illustrate the common concept of the below-explained embodiments according to which the audio fragmentation is rendered fully aligned to the video fragmentation by aligning the audio frames 12 to beginning 30 of fragments 10 which, in turn, are chosen to be, for example, completely aligned to the video frames 4.

FIG. 1 thus shows an audio and a video fragment, both being aligned in the described way. In the example of FIG. 1, the video and audio fragment were chosen to have a constant temporal length $$T_{fragment} \text{ of } \frac{1001}{1000} \sec = 1.001 \sec$$

which is equivalent to 60 video frames at the NTSC frame rate of 59.94 Hz.

The last audio frame of each audio fragment, here AU 46, is for example truncated to match the fragment duration. In the given example, the last audio frame reaches from sample 47104 to 48127 wherein a zero-based numbering has been chosen, i.e. the first audio sample in the fragment is numbered zero. This leads to a fragment size of a number of samples which is slightly longer than needed, namely 48128 instead of 48048. Therefore, the last frame is cut right after the $944^{th}$ sample. This can be accomplished by using, for example, an edit list contained for example in the header data 24 or in the configuration data 26. The truncated part 16 can be encoded with less quality, for example. Alternatively, there would be the possibility to not transmit all audio frames 12, but to leave out, for example, the coding of the last frame, here exemplarily AU 46, since the decoder can normally be flushed depending on the audio configuration.

In the embodiments described further below, it will be shown that measures may be taken to counteract the problem that the decoder which operates, for example, on an overlapping windows function will lose its history and is not able to produce a full signal for the first frame of the following fragment. For that reason, the first frame, in FIG. 1 exemplarily AU0, is coded as an IPF frame allowing immediate playout (IPF=Immediate Playout Frame). It is placed right at the beginning of the respective fragment and any audio fragment, respectively. Likewise, the first video frame 4 may be an IDR frame (IDR=Instantaneous Decoding Refresh).

temporal fragment 10 is temporally aligned 50 by the fragment provider 38 such that the frame boundaries 42 comprise one frame boundary which coincides with the beginning 30 of the current temporal fragment 10. As described above with respect to FIG. 1, owing to the fact that the temporal length of the temporal fragment 10 being a non-integer multiple of the temporal length of the frames 12, a trailing frame 12a merely partially covers or temporally overlaps with a temporal fragment 10 with a portion 16 thereof covering with the succeeding portion 48 of the audio content.

Figure 3:
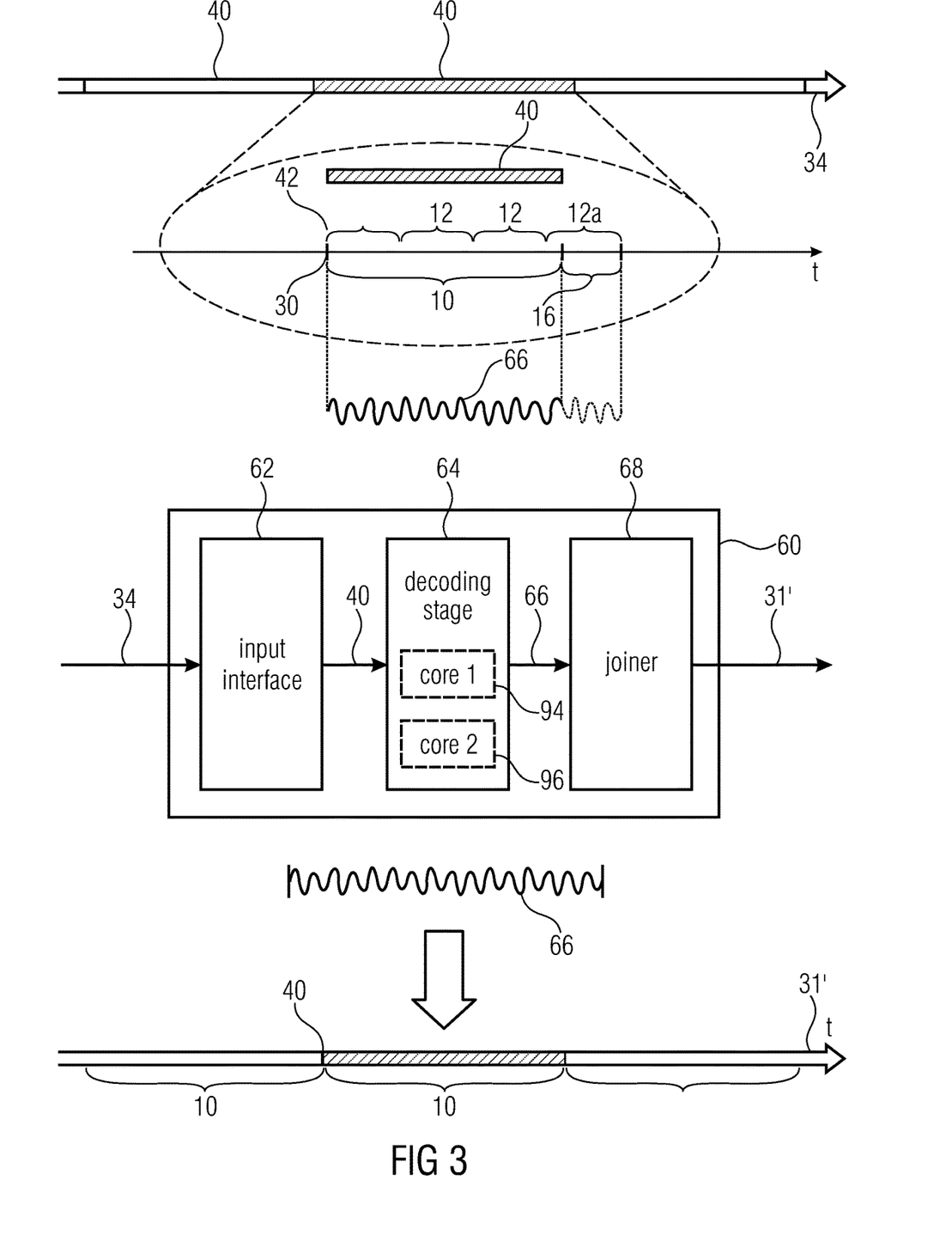
FIG. 3 shows a semi-schematic and block diagram of a decoder fitting to the encoder of FIG. 2 in accordance with an embodiment.

Before describing in detail the functionality of the encoder of FIG. 2, reference is made to FIG. 3, which shows a corresponding decoder in accordance with an embodiment. The decoder of FIG. 3 is generally indicated using reference sign 60 and is configured to decode audio content 31 in units

TABLE 1

| Overhead (worst-case) | Bitrate overhead | | | | | |
|---|---|---|---|---|---|---|
| | No sbr (1 sec) | Sbr 2:1 (1 sec) | No sbr (2 sec) | Sbr 2:1 (2 sec) | No sbr (0.5 sec) | Sbr 2:1 (0.5 sec) |
| Fragment size (sec): | 1.001 | 1.001 | 2.002 | 2.002 | 0.5005 | 0.5005 |
| Frame size (samples): | 1024 | 2048 | 1024 | 2048 | 1024 | 2048 |
| Samplingrate: | 48000 | 48000 | 48000 | 48000 | 48000 | 48000 |
| Preroll (aus): | 5 | 3 | 5 | 3 | 5 | 3 |
| Normal aus/fragment: | 46.921875 | 23.4609375 | 93.84375 | 46.921875 | 23.4609375 | 11.73046875 |
| Aligned aus/fragment: | 52 | 27 | 99 | 50 | 29 | 15 |
| Overhead: | 10.80% | 15.10% | 5.50% | 6.60% | 23.60% | 27.90% |

The above table gives an example for the expected bitrate overhead if no optimization would be applied. It can be seen that the overhead depends strongly on the used fragment duration $T_{fragment}$. Depending on the broadcaster's requirement, it is feasible to align only every second or third fragment, respectively, i.e. choosing the audio fragments to be longer.

FIG. 2 shows an encoder for encoding audio content in units of the temporal fragments 10 of a fragment grid 32 into an encoded data stream 34. The encoder is generally indicated using reference sign 20 and comprises an encoding stage 36 and a fragment provider 38. The encoding stage 36 is configured to encode audio content in units of frames 12 of a frame grid and the fragment provider 38 is configured to provide the audio content 31 to the encoding stage 36 in units of temporal fragments 10 so that each temporal fragment is encoded by the encoding stage 36 into an encoded representation 38 of the respective temporal fragment 10, wherein the fragment provider 38 is configured to provide the audio content 31 to the encoding stage 36 in units of the temporal fragments 10 such that each temporal fragment of the respective frame grid of frames 12 is temporally aligned to the beginning 30 of the respective temporal fragment 10 so that the beginning 30 coincides with a frame boundary 42 of the respective frame grid of frames 12. That is, as further described hereinafter, fragment provider 38 may provide encoding stage 36, temporal fragment 10 wise, with a portion 44 of the audio content 31 which includes the temporal fragment 10 currently provided and optionally a portion 46 of the audio content 31 temporally preceding the current temporal fragment 10, and a portion 48 temporally succeeding the current temporal fragment 10. In providing the encoding stage 36 with a current portion 44, the current of temporal fragments 10 from the encoded data stream 34. The decoder 60 comprises an input interface 62 which receives encoded representations of the temporal fragments. As illustrated in FIG. 3 using hatching and as already explained with respect to FIG. 2, for each temporal fragment 10, an encoded representation 40 thereof is present in the data stream 34. Each encoded representation 40 has encoded thereinto its associated temporal fragment 10 in units of the aforementioned frames 12 temporally aligned to the beginning 30 of the respective temporal fragment 10 so that the beginning 30 coincides with a frame boundary 42 of the frame grid.

The decoder 60 further comprises a decoding stage 64 configured to decode reconstructed versions 66 of the temporal fragments 10 from the encoded representations 40. That is, decoding stage 64 outputs, for each temporal fragment 40, a reconstructed version 66 of the audio content as covered by the temporal fragment 10 to which the respective encoded representation 40 belongs.

The decoder 60 further comprises a joiner 68 configured to join, for playout, the reconstructed versions 66 of the temporal fragments 10 together with, inherently, aligning the beginnings of the reconstructed versions 66 of the temporal fragments so as to coincide with the fragment boundaries of the fragment grid, i.e. at the beginnings 30 of the fragment grid, as the individual frame grids of the fragments 10 are registered thereto.

Thus, encoder 20 and decoder 60 of FIGS. 2 and 3 operate as follows. The encoder 20 encodes each temporal fragment 10 into a corresponding encoded representation 40 such that the frame grid of frames 12 is aligned to the beginning 30 of the corresponding temporal fragment 10 such that a first or leading frame $12_b$ immediately starts at beginning 30, i.e. the beginnings of temporal fragment 10 and first frame $12_b$ coincide. The problem how the encoding stage 36 treats the trailing frame $12_a$, which merely partially overlaps the temporal fragment 10 may be solved differently, as set out below. Further, as the encoding stage 36 realigns its frame grid for each temporal fragment 10, encoding stage 36 encodes the temporal fragments 10 into their corresponding encoded representation 40 in a completely self-contained manner, i.e. independent from the other temporal fragments. Nevertheless, the encoding stage 36 encodes the temporal fragments 10 into their corresponding encoded representations 40 such that immediate playout is allowed at the decoding side for each temporal fragment. Possible implementation details are set out below. In turn, the decoder 60 reconstructs from each encoded representation 40 a reconstructed version 66 of the corresponding temporal fragment 10. The reconstructed version 66 may be as long as the corresponding temporal fragment 10. To this end, as described further below, decoding stage 64 may perform flushing in order to extend the temporal length of the reconstructed version 66 to the temporal length of the temporal fragments 10, or decoding stage 64 and joiner 66 may, as discussed below, cooperate in order to truncate or disregard temporal portions of the reconstructed version 66, which would otherwise exceed the temporal length of the temporal fragments. The decoding stage 64, in performing the decoding of the encoded representations 40, also uses the frame grid, i.e. performs the decoding in units of the frames 12 and substantially performs an inverse of the encoding process.

In the following, the possibility is discussed according to which the encoding stage 36 also attends to encoding the trailing frame 12a into the corresponding encoded representation 40, and that the decoder attends to a truncation of the corresponding overhanging portions of the reconstructed version 66. In particular, in accordance with this example, the encoding stage 36 and the fragment provider 38 may cooperate such that, for a current temporal fragment 10, the encoding of this temporal fragment 10 into the encoded representation 40 is continued beyond the trailing end 70 of the current temporal fragment 10 as far as the trailing frame $12_a$ is concerned. That is, the encoding stage 36 also encodes the overhanging portion 16 of the audio content into the encoded representation 40. In doing so, however, the encoding stage 36 may shift the bitrate spent for encoding this trailing frame $12_a$ into the encoded representation 40 from the overhanging portion 16 to the remaining portion of trailing frame $12_a$, i.e. the portion temporally overlapping with the current temporal fragment 10. For example, the encoding stage 36 may lower the quality at which the overhanging portion 16 is coded into the encoded representation 40 compared to the quality at which the other portion of trailing frame $12_a$ is coded into the encoded representation 40, namely the one belonging to the current temporal fragment 10. In that case, the decoding stage 64 would accordingly decode from this encoded representation 40 a reconstructed version 66 of the corresponding temporal fragment 10 which temporally exceeds the temporal length of the temporal fragment 10, namely as far as the overhanging portion 16 of the trailing frame $12_a$ is concerned. The joiner 68, in aligning the reconstructed version 66 with the fragmentation grid, i.e. with the fragments' beginnings 30, would truncate the reconstructed version 66 at the overhanging portion 16. That is, joiner 68 would disregard this portion 16 of the reconstructed version 66 in playout. The fact that this portion 16 might have been coded at lower quality as explained above, is accordingly transparent for the listener of the reconstructed audio content 31', which is the result of the joining of the reconstructed versions 66 at the output joiner 68, as this portion is replaced, in playout, by the beginning of the reconstructed version of the next temporal fragment 10.

Alternatively, the encoder 20 may be operative to leave out the trailing frame $12_a$ in encoding a current temporal fragment 10. Instead, the decoder may attend to fill the non-encoded portion of the temporal fragment 10, namely the one with which the trailing frame 12a partially overlaps, by flushing its internal state as described exemplarily further below. That is, the encoding stage 36 and fragment provider 38 may cooperate such that, for a current temporal fragment 10, the encoding of this temporal fragment into its encoded representation 40 is seized at the frame 12 immediately preceding the trailing frame $12_a$. The encoding stage may signal within the encoded representation 40 a flush signalization instructing the decoder to fill the remaining, thus non-encoded portion of the temporal fragment 10, namely the one which overlaps with the trailing frame $12_a$, by means of flushing internal states of the encoder as manifesting themselves up to the frame 12 immediately preceding the trailing frame $12_a$. At the decoder side, the coding stage 64 may be responsive to this flush signalization so as to, when decoding the corresponding encoded representation 40, generate the reconstructed version 66 of the temporal fragment 10 corresponding to this encoded representation 40 within the portion at which the temporal fragment 10 and a trailing frame $12_a$ overlap by flushing its internal states of the decoding stage 64 as manifesting themselves up to the immediately preceding frame 12 of the trailing frame $12_a$.

Figure 4:
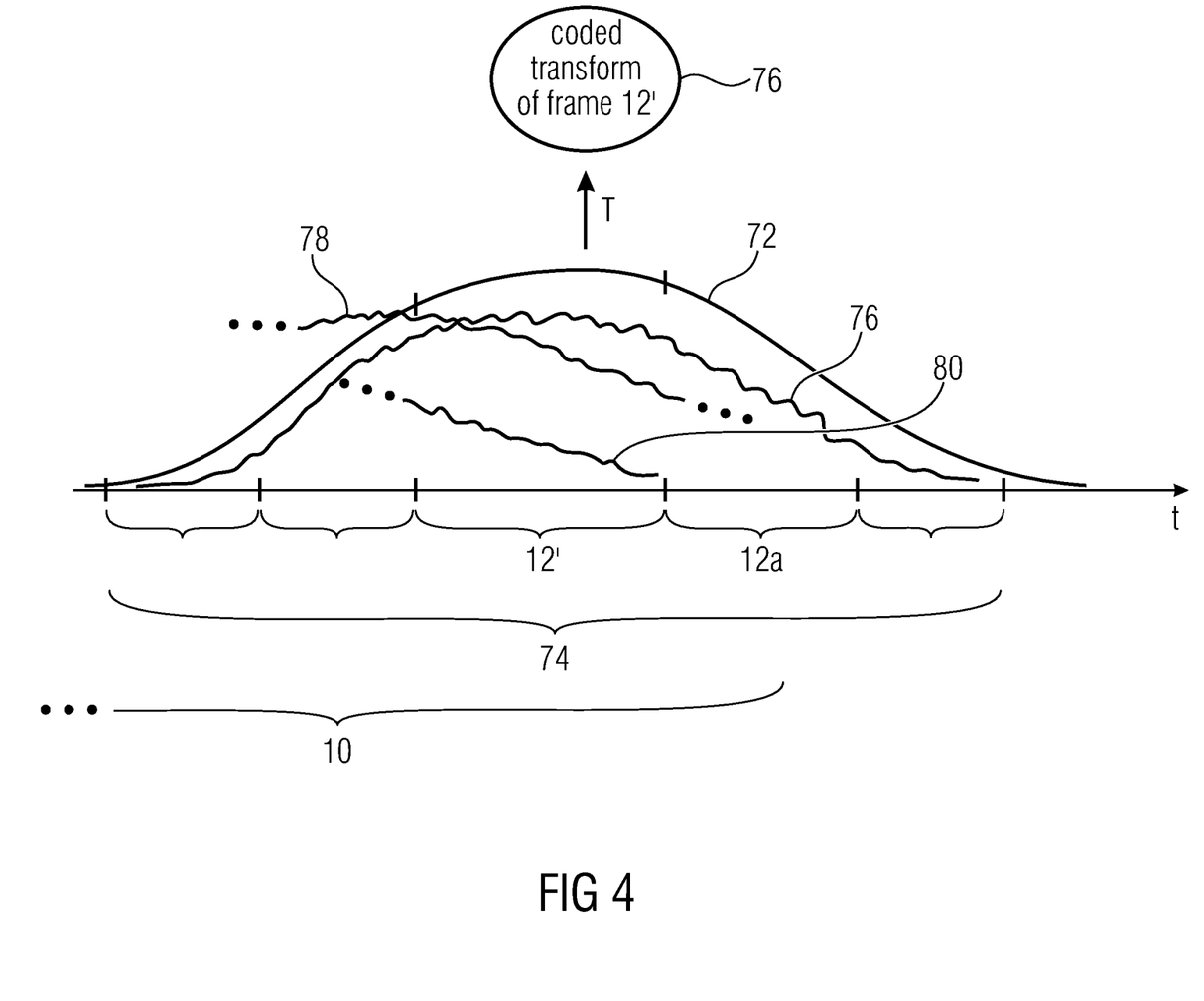
FIG. 4 shows a schematic diagram of windows, time-domain portions involved in the encoding/decoding process in accordance with an embodiment according to which transform-based coding/decoding is used for coding/decoding the frames, namely by applying a lapped transform.

In order to illustrate the flushing procedure in more detail, reference is made to FIG. 4, which illustrates the case of generating a non-encoded remainder portion of the reconstructed version 66 for the exemplary case of the encoding and decoding stages operating on the basis of a transform codec. For example, a lapped transform may be used to encode the frames. That is, the encoding stage 36 uses one window 72 of several windows in order to weight corresponding interval(s) 74 of the audio content with spectrally decomposing the resulting windowed portion by use of a frequency decomposing transform such as an MDCT or the like. The windowed portion 74 covers and temporally extends beyond the current frame's 12' boundaries. FIG. 4, for instance, illustrates that the window 72 or windowed portion 74 temporally overlaps with two frames 12 preceding the current frame 12' at two frames succeeding the current frame 12'. Thus, the encoded representation 40 for a current temporal fragment 10 comprises the coding of the transform of the windowed portion 74 as this coding 76 is the coded representation of frame 12'. The decoding stage 64 performs the inverse in order to reconstruct the frames 12 of the temporal fragments 10: it decodes the transform 76 by means of, for example, entropy decoding, performs the inverse transform so as to result in a windowed portion 74 which covers the current frame 12' to which transform 76 belongs, but the decoding stage 64 additionally performs an overlap-add process between consecutive windowed portions 74 so as to obtain the final reconstruction of the audio content 31'. The overlap-add process may be performed by joiner 68. This means the following: FIG. 4, for example, assumes that a current frame 12' is the penultimate frame immediately preceding the trailing frame $12_a$ of a current temporal fragment 10. The decoding stage 64 reconstructs the audio content covered by this penultimate frame 12' by performing, as just outlined, the inverse transformation onto the transform 76 so as to obtain a time-domain portion 76 within the windowed portion 74. As explained above, this time-domain portion 76 temporally overlaps with the current frame 12'. Other time-domain portions having been obtained by inverse transforming coded transforms of temporally neighboring frames of current frame 12' temporally overlap, however, with the current frame 12' as well.

In FIG. 4 this is illustrated for windowed portions belonging to the two preceding frames of current frame 12' and indicated reference sign 78 and 80. A complete reconstruction of frame 12' is however obtained by the overlap-add process which adds-up the portions of all time-domain portions 76, 78 and 80 resulting from inverse transforms applied onto coded transform 76 of frame 12' and neighboring frames thereof, as overlapping the current frame 12' temporally. For the last or trailing frame $12_a$, this means the following. Even if the encoding stage 36 does not code the transform(s) of the windowed portion for this trailing frame $12_a$ into the encoded representation 40, the decoder is able to obtain an estimation of the audio content within this trailing frame $12_a$ by adding-up all time domain portions temporally overlapping the trailing frame $12_a$ as obtained by reverse transforming the coded transforms 76 of one or more previous frames, i.e. of frame 12' and optionally one or more frames 12 preceding the penultimate frame 12' depending on window size, which may be varied compared to FIG. 4. For example, the window size may be such that the temporal overlap with temporally preceding frames is greater than the temporal overlap with succeeding frames. Moreover, the temporal overlap may merely involve the immediately preceding and/or immediately succeeding frame of a currently coded frame.

Different possibilities exist with respect to the manner in which the decoder 60 is informed of the size of overhanging portion 16. For example, the decoder 60 may be configured to convey truncation information related to this size within the data stream 34 by way of the truncation information comprising a frame length value and a fragment length value. The frame length value could indicate $T_{frame}$ and the fragment length value $T_{fragment}$. Another possibility would be that the truncation length value indicates the temporal length of the overhanging portion 16 itself or the temporal length of the portion at which the temporal fragment 10 and the trailing frame $12_a$ temporally overlap. In order to allow immediate playout of the reconstructed version 66 of each temporal fragment 10, the encoding stage 36 and fragment provider 38 may cooperate so that, for each temporal fragment 10, the encoded representation 40 is also provided with immediate playout information which relates to the portion 46 temporally preceding the respective temporal fragment 10. For example, imagine that the lapped transform referred to in FIG. 4 is a lapped transform introducing aliasing, such as an MDCT. In that case, without a transform coded version of the preceding portion 46, a decoder would not be able to reconstruct a current temporal fragment 10 at its beginning, such as within the first one or more frames 12 thereof without aliasing. Accordingly, in order to perform the time domain aliasing cancellation by means of the overlap-add process, the immediate playout information conveyed within the encoded representation 40 could pertain to a transform coded version of the preceding portion 46 with the encoding and decoding stages using the lapped transform coding process as already illustrated with regard to FIG. 4.

Although it has not been discussed in more detail above, it is noted that encoding stage 36 and/or decoding stage 64 could be composed of two or even more cores. For example, FIG. 2 illustrates that the encoding stage could comprise a first encoding core 90 and a second encoding core 92 and likewise, additionally or alternatively, FIG. 3 shows that decoding stage 64 could comprise a first decoding core 94 and a second decoding core 96. Instead of sequentially encoding/decoding the respective temporal fragments 10 and corresponding encoded representations 40, the encoding/decoding procedure performed with respect to each of these pairs of temporal fragments 10 and encoded representations 40 could be performed in a pipelined manner with alternately engaging cores 94 and 96 (and 90 and 92) with a decoding/encoding of the sequence of temporal fragments 10 and the encoded representations 40, respectively.

Thus, in accordance with the embodiment of FIG. 2, the audio encoder aligns the first audio frame $12_b$ with the beginning 30 of the respective temporal fragment 10. In order to enable a gapless or immediate playout of the respective constructed version 66 of that temporal fragment 10 with no audible artifacts at the decoding side, the encoder described above operates or words on two different frame grids at fragment boundaries. It was also mentioned that in order to allow for an immediate playout of the individual reconstructed versions 66 at the fragment's beginning 30, depending on the audio codec underlying the encoding/decoding stages, immediate playout information may be conveyed within the encoded representations.

Figure 5:
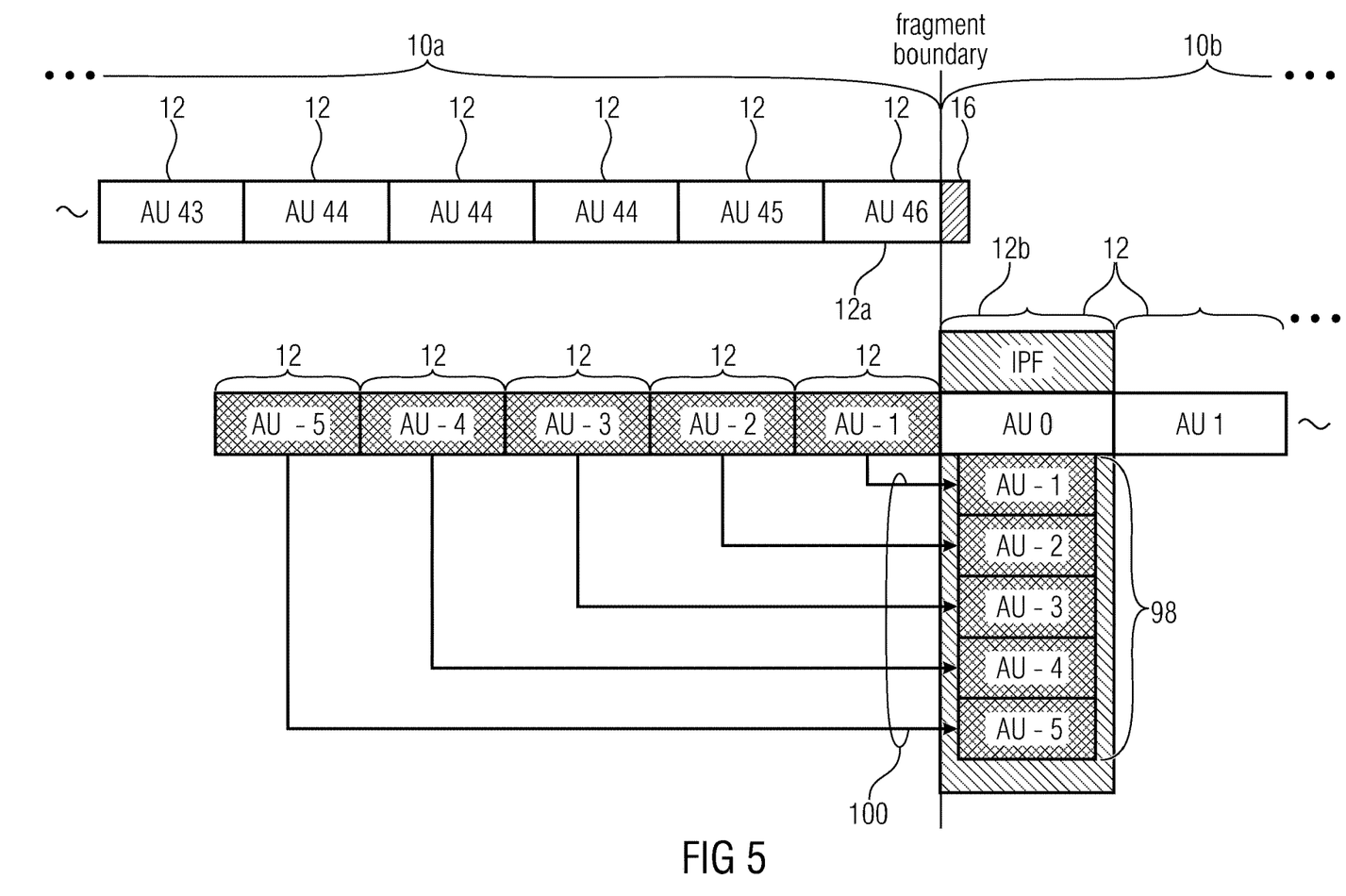
FIG. 5 shows a schematic diagram illustrating the generation of immediate playout information in accordance with an embodiment.

For example, the first frame $12_b$ of each temporal fragment may be coded as an immediate playout frame IPF. Such IPF being placed at a beginning of each new temporal fragment may, for instance, cover the whole decoder delay. In order to illustrate this again, reference is made to FIG. 5, which shows a portion out of an audio content around a fragment boundary between two temporal fragments 10a and 10b. The frames 12 in units of which the temporal fragments $10_a$ and $10_b$ are coded/decoded are shown in FIG. 5 as well. In particular, FIG. 5 reveals that the trailing frame $12_a$ of temporal fragment $10_a$ temporally overlaps the first frame $12_b$ of the frames of the frame grid using which the temporal fragment $10_b$ is coded/decoded. In particular, it is the portion 16 which extends beyond the trailing end of temporal fragment $10_a$ and the beginning 30 of temporal fragment $10_b$ of the trailing frame $12_a$, which temporally overlaps with the first frame $12_b$ of temporal fragment $10_b$. In encoding the first frame $12_b$, the encoding state additionally encodes into the encoded representation 40 for temporal fragment $10_b$ immediate playout information 98, namely here exemplarily coding 100 of five pre-roll frames 12 of the frame grid for coding/decoding the temporal fragment $10_b$ preceding the first frame $12_b$, the pre-roll frames being indicated by "AU −5" to "AU −1" in FIG. 1. These pre-roll frames thus span the aforementioned preceding portion 46. The encodings 100 may, as outlined above with respect to FIG. 4, relate to transform coding version of the audio content within the pre-roll frames so as to allow the decoder side to perform time domain aliasing cancelation using the time-domain portions surrounding these-roll frames using inverse transformation and using their parts extending into temporal fragment $10_b$ so as to perform the time-domain aliasing cancelation in the overlap-add process.

The encoder is aware of the exact fragment duration. As explained above, in accordance with an embodiment, the overlapping audio part 16 may be encoded two times with different frame grids.

A brief statement is performed with respect to the "self-contained manner" at which the individual temporal fragments 10 are coded into their encoded representations 40. Although this self-contained manner could also pertain to configuration data such as coding parameters pertaining to more seldom changing data such as number of encoded audio channels or the like, so that each encoded representation 40 could comprise this configuration data, it would alternatively be possible that such seldom changing data, i.e. configuration data, is conveyed to the decoding side out of band, not within each encoded representation 40 instead of being included in each encoded representation 40. If included in the encoded representation, the configuration data may be transmitted in another transport layer. For example, the configuration may be transmitted in the initialization segment, and the IPF frame 12$_b$ of each temporal fragment could be freed from carrying the configuration data information.

As far as the decoding side is concerned, the above description of FIG. 3 revealed that the decoder be configured to decode pre-roll frames, i.e. frames preceding the first frame 12$_b$ for each temporal fragment. The decoder may attend to this decoding irrespective of whether the configuration changes from the preceding temporal fragment to a current temporal fragment. This of course impacts the decoder's overall performance, but advantageously, a decoder may already have to fulfill a requirement according to which the decoder is able to decode an IPF on each fragment boundary such as, for example, in accordance with a worst-case adaptive streaming use-case, so that no additional requirement is imposed in the case of such cases. As far as the above mentioned truncation information is concerned, it should be noted that the signaling thereof may be done on the bitstream level, or at some other transport layer such as with system level tools.

Figure 6:
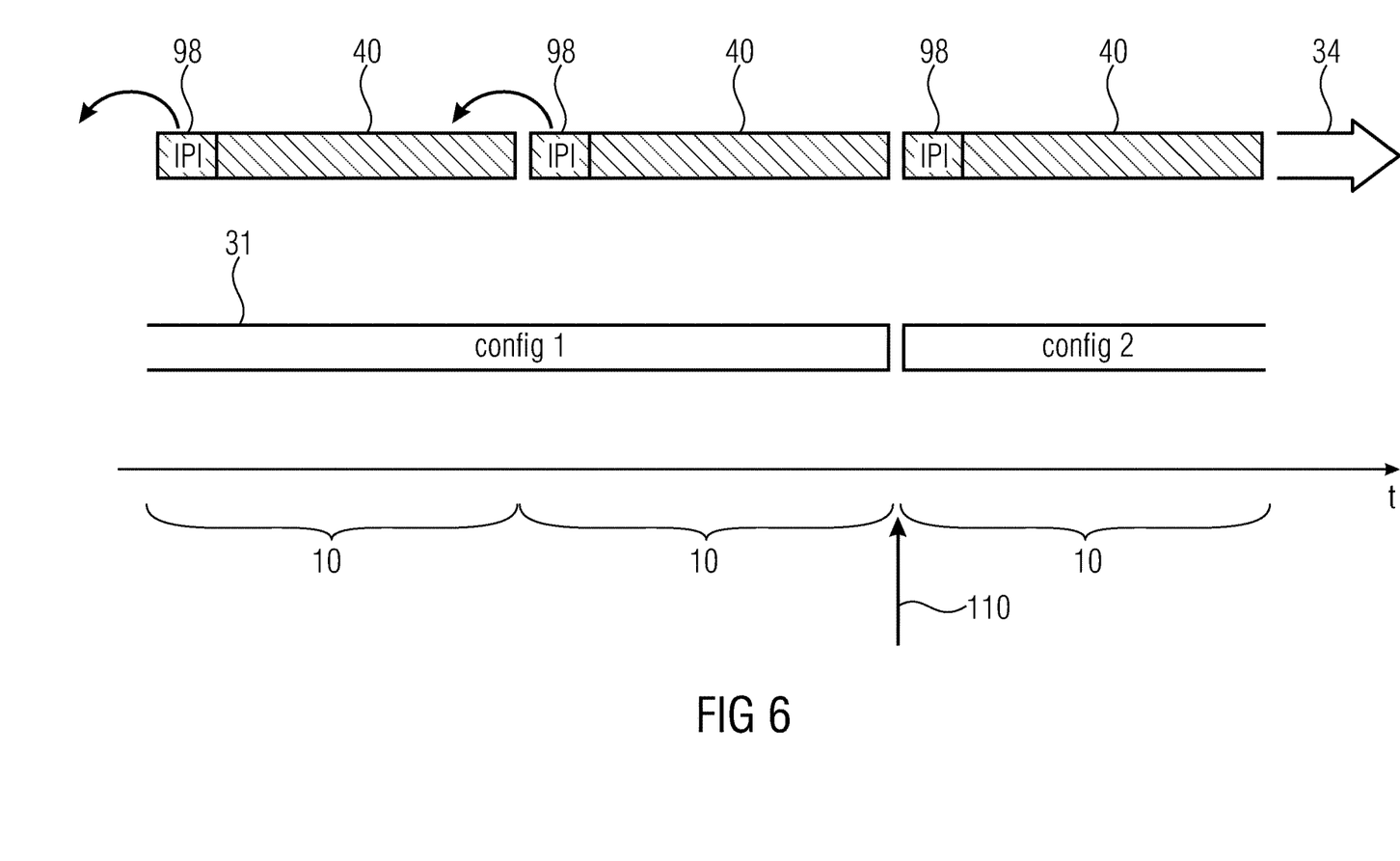
FIG. 6 shows a schematic diagram illustrating the case of a configuration change in the audio content in accordance with an embodiment showing that, for example, immediate playout information may be missing in case of a configuration change at the beginning of a respective temporal fragment, or where the immediate playout information of such temporal fragment encodes zero samples instead.

Finally, FIG. 6 shows a case where the audio content 31 to be encoded shows a configuration change such as a change in a number of audio channels, at some point in time 110, namely at a fragment boundary between two temporal fragments 10. For example, immediately preceding time instant 110, a first configuration such as stereo applies, whereas after time instant 110, the audio content 31 is for example a five-channel audio scene. The audio data stream 34 comprises the configuration data information. Thus, it is clear from the data stream 34 that the data stream's encoded representations of the temporal fragments 10 preceding time instant 110 are coded according to the first configuration, and that the second configuration is used for encoding the temporal fragments 10 succeeding the time instant 110. FIG. 6 also shows the immediate playout information 98 of the encoded representations 40. In the case of the temporal fragment 10 preceding time instant 110, the immediate playout information 98 may be derived as described above with respect to FIG. 5, for example. However, the situation is different for the temporal fragment 10 immediately starting at time instant 110. Here, the audio content 39 does not allow for forming the immediate playout information 98 for the encoded representation 40 of the temporal fragment immediately starting at time instant 110, as the audio content 39 in the second configuration is not elevatable at the time prior to the time instant 110. A zero-signal may be coded as immediate playout information 98 with respect to this temporal fragment 10 starting at time instant 110, instead. That is, in case of a configuration change, the encoder may encode zero samples since there is no actual audio signal available for the past, such as, for example, when switching from mono to 5.1 or the like. A possible optimization would be to generate this zero frame, i.e. zero pre-roll frame, on the decoder side and to transmit only the encoding of the first frame 12$_b$ of the first temporal fragment. That is, in such a case the immediate playout information 98 could be left away completely.

Thus, the above embodiments allow the delivery of audio and video content over a transmission channel with either fixed or variable bitrate and allow, in particular, audio video synchronization and enable advanced use-cases such as splicing. As mentioned above, the encoded data stream as encoded above, may also render easier a synchronization with other clocks such as clocks prescribed by other media signals. The encoders described above allow for an adaptation of an existing audio frame length. The length of the temporal fragments may be set depending on the application's needs. The encoder embodiments form the encoded data stream in tranches of encoded representation of the temporal fragments which may, for instance, but not exclusively, be made the subject of adaptive streaming by using these fragments as the fragments of a media representation. That is, the coded data stream, composed of the resulting fragments, may be offered to a client by server via an adaptive streaming protocol, and the client may retrieve the data stream fragments with, maybe, an add inserted thereinto, via the protocol and forward same to the decoder for decoding. But this is not mandatory. Rather, splicing may be advantageously be affected by the formation of the inventive encoded data stream even in other application scenarios. The above described embodiments may be implemented or used in connection with MPEG-H audio codec with the audio frames being MPEG-H audio frames, but the above embodiments are not restricted to the usage of this codec but may be adapted to all (modern) audio codecs.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

The inventive spliced or splicable audio data streams can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

| DEFINITIONS AND ABBREVIATIONS | |
| --- | --- |
| AAC | Advanced Audio Coding |
| ATSC | Advanced Television Systems Committee |
| AU | Audio Access Unit |
| DASH | Dynamic Adaptive Streaming over HTTP |
| DVB | Digital Video Broadcasting |

-continued

| DEFINITIONS AND ABBREVIATIONS | |
| --- | --- |
| IPF | Instantaneous Playout Frame |
| MPD | Media Presentation Description |
| MPEG | Moving Picture Experts Group |
| MMT | MPEG media transport |
| NTSC | National Television Systems Committee |
| PAL | Phase-Alternating-Line-Verfahren |

REFERENCES

[1] "Delivery/Sync/FEC-Evaluation Criteria Report", ROUTE/DASH
[2] ISO/IEC 23008-3, "Information technology—High efficiency coding and media delivery in heterogeneous environments—Part 3: 3D audio"
[3] ISO/IEC 23009-1, "Information technology—Dynamic adaptive streaming over HTTP (DASH)—Part 1: Media presentation description and segment formats"
[4] ISO/IEC 23008-1, "Information technology—High efficiency coding and media delivery in heterogeneous environments—Part 1: MPEG media transport (MMT)"

The invention claimed is:

1. A method for decoding audio content from an encoded data stream,
wherein the encoded data stream comprises encoded representations of temporal fragments of the audio content, each of which has encoded thereinto a respective temporal fragment of the audio content in units of audio frames temporally aligned to a beginning of the respective temporal fragment so that the beginning of the respective temporal fragment coincides with a beginning of a first audio frame of the audio frames,
wherein the method comprises
decoding reconstructed versions of the temporal fragments of the audio content from the encoded representations of the temporal fragments; and
joining, for playout, the reconstructed versions of the temporal fragments of the audio content together by
truncating the reconstructed version of a predetermined temporal fragment at a portion of a trailing audio frame of the audio frames in units of which the predetermined temporal fragment is coded into the encoded representation of the predetermined temporal fragment, which temporally exceeds a trailing end of the predetermined temporal fragment,
determining the portion of the trailing audio frame on the basis of truncation information in the encoded data stream, wherein the truncation information comprises
a frame length value indicating a temporal length of the audio frames in units of which the predetermined temporal fragment is coded into the encoded representation of the predetermined temporal fragment, and a fragment length value indicating a temporal length of the predetermined temporal fragment from the beginning of the reconstructed version of the predetermined fragment to the fragment boundary with which the beginning of the reconstructed version of the succeeding temporal fragment coincides, and/or
a truncation length value indicating a temporal length of the portion of the trailing audio frame or the difference between the temporal length of the portion of the trailing audio frame and the temporal length of the trailing audio frame.

2. The method according to claim 1, wherein the decoding a further predetermined temporal fragment from the encoded representation of the further predetermined temporal fragment comprises generating the reconstructed version of the further predetermined temporal fragment within a portion of a trailing audio frame of the audio frames in units of which the further predetermined temporal fragment is coded into the encoded representation of the further predetermined temporal fragment, which portion extends from a leading end of the trailing audio frame up to the fragment boundary at which a reconstructed version of a succeeding temporal fragment abuts, by flushing internal decoder states as manifesting themselves up to an audio frame immediately preceding the trailing audio frame.

3. The method according to claim 1, comprising deriving immediate playout information from the encoded representations of an even further predetermined temporal fragment, the immediate play-out information being related to the audio content at one or more pre-roll audio frames of the audio content which temporally precede(s) a beginning of the even further predetermined temporal fragment and use the immediate playout information so as to reconstruct the audio content at one or more audio frames of the even further predetermined temporal fragment immediately succeeding the beginning of the even further predetermined temporal fragment.

4. The method according to claim 3, wherein the immediate playout information is a reconstruction of the audio content at the one or more pre-roll audio frames.

5. The method according to claim 3, the immediate playout information is used in reconstructing the audio content at the one or more audio frames of the even further predetermined temporal fragment immediately succeeding the beginning of the even further predetermined temporal fragment for time domain aliasing cancellation.

6. The method according to claim 1, comprising decoding the audio frames individually using an inverse of a lapped transform causing aliasing and incurring transform windows extending beyond the frames' boundaries.

7. The method according to claim 1, wherein
the decoding reconstructed versions of the temporal fragments of the audio content from the encoded representations of the temporal fragments comprises decoding the reconstructed versions of the temporal fragment of the audio content alternatively from two decoding cores.

* * * * *